United States Patent [19]

Hubbard

[11] 4,411,328
[45] Oct. 25, 1983

[54] LOW RANGE AUTOMATIC WEIGHING DEVICE

[75] Inventor: David W. Hubbard, Stamford, Conn.

[73] Assignee: Pitney Bowes Inc., Stamford, Conn.

[21] Appl. No.: 361,310

[22] Filed: Mar. 24, 1982

[51] Int. Cl.³ .............................................. G01G 1/29
[52] U.S. Cl. ................................... 177/212; 177/178; 177/237
[58] Field of Search ............... 177/212, 191, 248, 237, 177/204, 205, 177, 178

[56] References Cited

U.S. PATENT DOCUMENTS

| | | | |
|---|---|---|---|
| 1,944,071 | 1/1934 | Essmann | 177/237 |
| 2,716,546 | 8/1955 | Stelzer | 177/204 X |
| 2,764,400 | 9/1956 | Mettler | 177/191 |
| 3,055,444 | 9/1962 | Chyo | 177/212 X |
| 3,111,180 | 11/1963 | Johnson | 177/191 X |
| 3,842,925 | 10/1974 | Crespi | 177/248 |
| 4,106,580 | 8/1978 | DeMasters | 177/212 X |

Primary Examiner—Joseph W. Hartary
Attorney, Agent, or Firm—Melvin J. Scolnick; Albert W. Scribner; William D. Soltow, Jr.

[57] ABSTRACT

A weighing device is disclosed which comprises a frame, a pan element for supporting a load to be weighed, a channel member connected to the pan for retaining a plurality of weight elements in a vertically movable manner, a motor supported within the frame and a shaft member operatively connected to and extending from the motor, the shaft member including a spring for supporting the pan element. A plurality of collapsible support members are secured at one end thereof to the frame and each have at their opposite ends a device that is adapted to receive and lift one of the weight elements when the support member is in an extended and non-collapsed position. A camming arm is secured to the shaft member and extends in a direction toward the support members. A switch is provided for energizing the motor when the pan is depressed by a load. The motor turns the shaft member and guides the camming arm into contact with successive collapsed support members in a step-by-step manner to place a number of the support members in an extended position and lift a corresponding number of the weights substantially equal to the weight of the load.

15 Claims, 3 Drawing Figures

LOW RANGE AUTOMATIC WEIGHING DEVICE

BACKGROUND OF THE DISCLOSURE

I. Field of the Invention

This invention relates to weighing devices, and more particularly to low range automatic balance devices having an optical readout system.

II. Description of the Prior Art

Many low range type of scales and balances have been devised and described in the prior art. Many of these devices, however, exhibit numerous problems. A basic disadvantage of a scale as compared to a balance is that scales are sensitive to regional gravitational variations and temperature variations. Several of the low range type of scales and balances described in the prior art do not have the degree of accuracy in weighing that is required in various situations, such as the weighing requirements that exist within the postal field. Furthermore, many of the known weighing devices are not automatic and do not provide for a direct visual readout of the weight of the object being weighed. In addition, many of these devices are relatively complex in design, difficult to manufacture, require the use of high cost materials and are expensive.

One example of a prior art type of low range scale is described in U.S. Pat. No. 2,716,546. The scale illustrated by this patent, when in a rest position, has a plurality of counterweights (balls) supported on a carrier by a spring. When a weight (e.g., a letter) is placed on the weighing pan, the spring extends, thereby successively depositing balls on a plurality of supports which are of different vertical heights so that during the descent of the weighing pan, balls are successively deposited from a shelf onto the supports in a one after the other fashion. A linkage connected to the shelf, and responsive to its vertical height, operates a pointer for indicating the weight on the pan. The scale includes a bimetal strip for compensating for variations in the force of the spring resulting from changes in temperature. The sensitivity of the spring and the required adjusting of each of the counterweights to a particular height are two of the problems related to this type of scale which can alter the accuracy of any weight measurements made thereon. Other examples of scales disclosed by the prior art and relating to the present invention are illustrated in U.S. Pat. Nos. 213,898; 276,701; 1,661,556; 1,944,071; 3,108,647; 4,106,580; and 4,235,296.

SUMMARY OF THE INVENTION

It is therefore a primary object of the present invention to overcome many of the disadvantages of the type of low range weighing devices disclosed in the prior art.

It is a further object of the present invention to provide a low range automatic balance which is highly sensitive and highly accurate in its weight measurements.

It is a further object of the present invention to provide a low range automatic balance which has particular use in the postal field and which features a direct visual readout of the weight of the object being weighed.

It is still a further object of the present invention to provide a balance which is relatively simple in design, easy to manufacture, uses low cost materials in its construction and is relatively inexpensive.

The foregoing objects and others are accomplished in accordance with the present invention by providing a weighing device comprising: a frame, a pan element for supporting a load to be weighed, means connected to said pan for retaining a plurality of weight elements in a vertically movable manner, a motor supported within the frame, and a shaft member operatively connected to and extending from the motor including means to support the pan element. A plurality of collapsible support members are secured at one end thereof to the frame and each have at their opposite ends means adapted to receive and lift one of the weight elements when the support member is in an extended and non-collapsed position. A camming arm is secured to the shaft member and extends in a direction toward the support members. A switching means is provided for energizing the motor when the pan is depressed by a weighted load, the motor turning the shaft member and guiding the camming arm into contact with successive collapsed support members in a step-by-step manner to place a number of the support members in an extended position and lift a corresponding number of the weights equal to the weight of the load.

BRIEF DESCRIPTION OF THE DRAWINGS

For a better understanding of the invention, as well as other objects and further features thereof, reference is made to the following detailed disclosure of this invention taken in conjunction with the accompanying drawings wherein.

DESCRIPTION OF THE PREFERRED EMBODIMENTS

Figure 1:
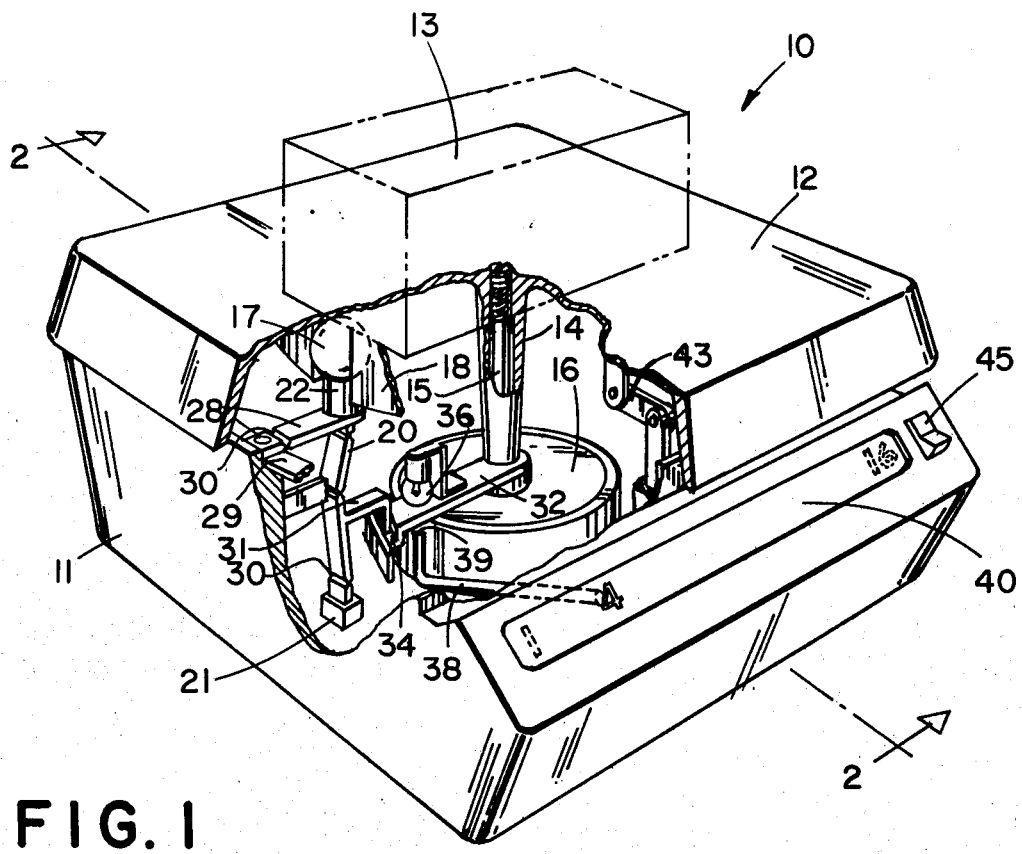
FIG. 1 is a perspective view, partly in section, of a balance in accordance with the features of the present invention.

Referring now to the drawings, and particularly to FIG. 1, there is shown a weighing device (balance) 10 including frame 11 encasing the components thereof. The balance includes a pan element or weighing pan 12 used for supporting a load 13 that is to be weighed by the balance. Preferably extending from the bottom portion of pan 12 is a hollow shaft member 14. The weighing pan is supported by a shaft member 15 that lies within hollow shaft member 14. Shaft member 15 is operatively connected to and extends from a motor 16. The pan includes and supports plurality of weight elements, preferably in the form of balls 17, that are retained in a ball retaining ring 18 that encircles the bottom portion of the pan in a closed path (see FIG. 3). Ball retaining ring 18 extends down from the bottom portion of pan 12 preferably in the form of a U-shaped channel member (see FIG. 2). Each of balls 17 are retained in the retaining ring in a manner which permits each of the balls to move vertically as shown by arrow 19 (see FIG. 2).

Figure 2:
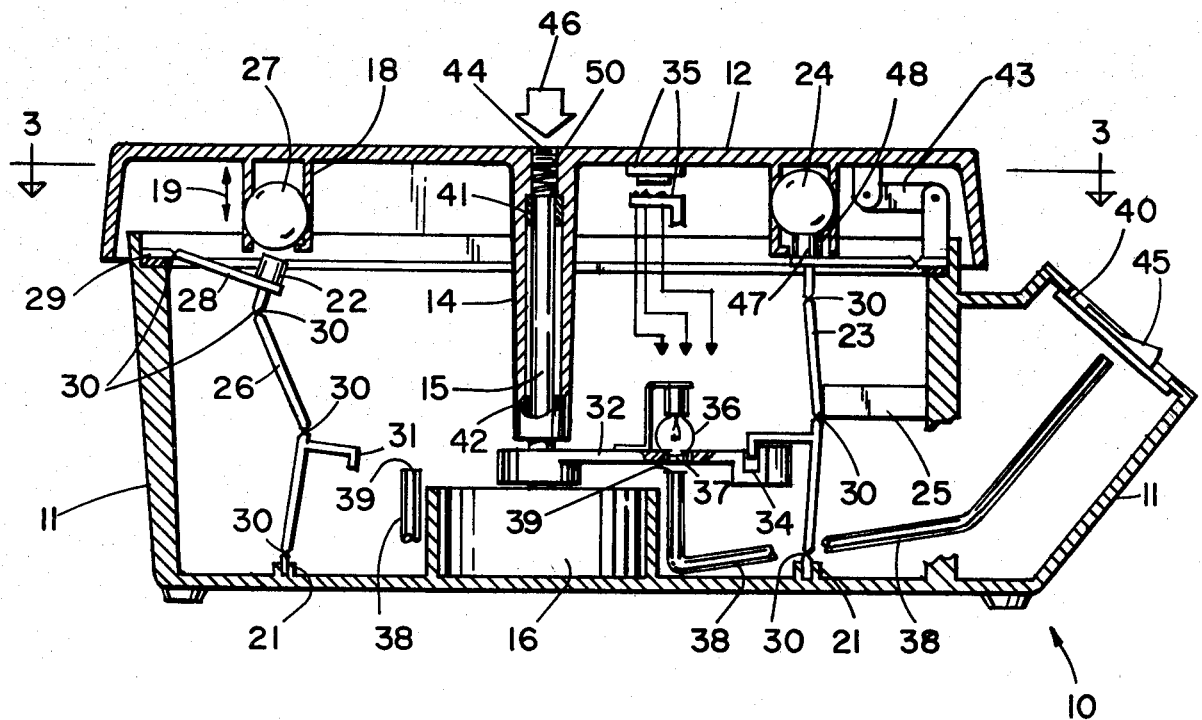
FIG. 2 is a longitudinal plan sectional view taken along line 2—2 of FIG. 1.
Figure 3:
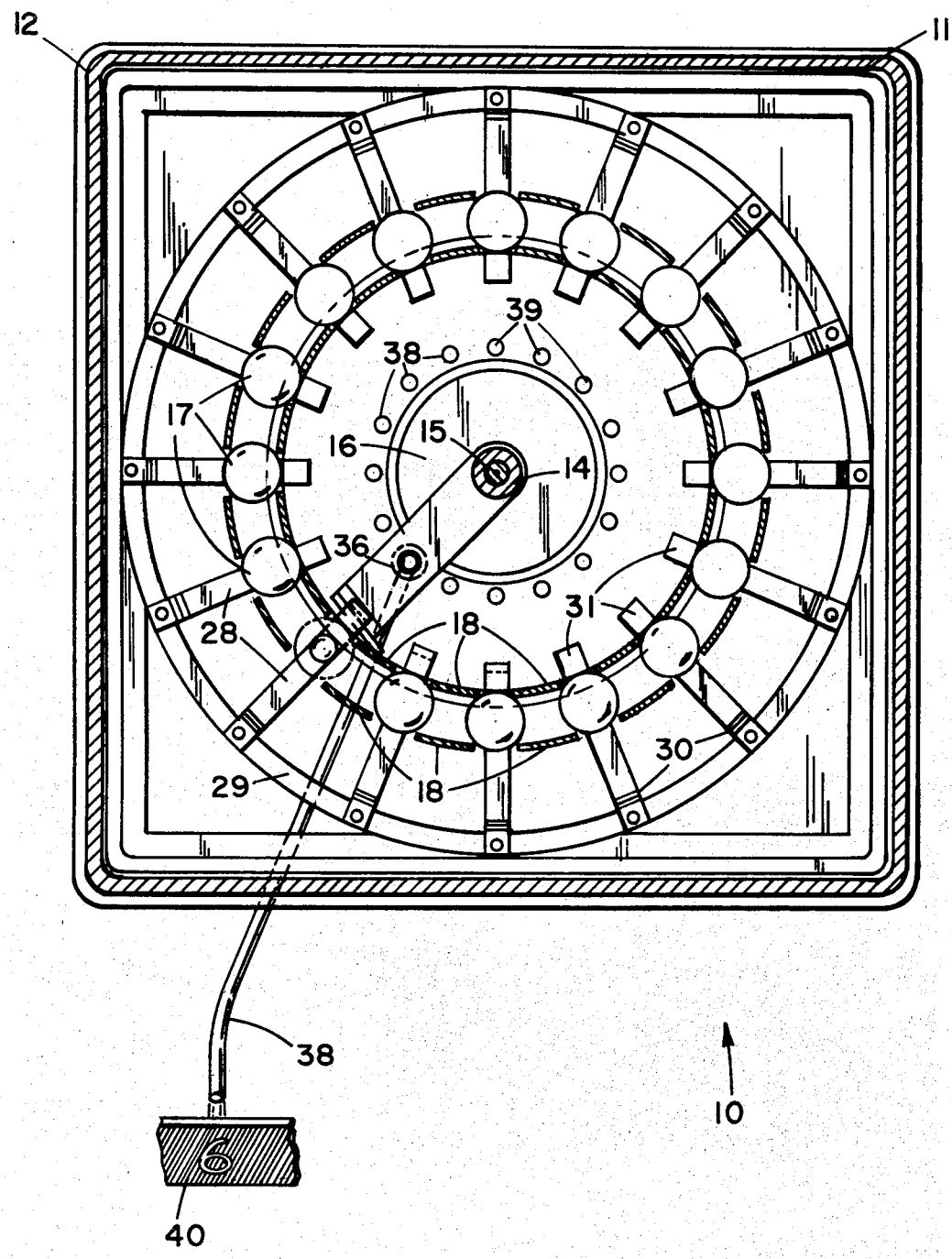
FIG. 3 is a top plan sectional view taken along line 3—3 of FIG. 2.

As shown in FIG. 2, plurality of collapsible support members 20 are arranged in the frame. In accordance with one preferred embodiment of the present invention these support members can be arranged in a concentric path. In accordance with the specific example of a balance described hereinbelow, sixteen support members are arranged in a circular path. Each of the support members are secured at one end to frame 11 to a support ring 21, and each have at their opposite end portions a means that is adpated to receive and lift one of the balls 17, preferably in the form of cup-like element 22. The support members are secured to the frame in a manner which positions a cup-like element directly under the vertical path of travel of each of the balls 17. Thus, there is one support member 20 for each ball 17. Each cup-like element 22 is adapted to receive and lift one of the weight elements (balls) when the corresponding support member supporting the cup-like element is in an extended and non-collapsed position as exemplified by support member 23 and ball 24. When in this position each of the support members 20 has a corresponding stop element 25 upon which the support member rests and is prevented from collapsing. Note, support member 26 which is an example of a support member in a collapsed position with the corresponding ball 27 being supported by the ball retaining ring 18. Secured to each of the support members, forming a part thereof, and positioned below each of the cup-like elements 22 is a stabilizing arm member 28 the function of which is to keep each of the cup-like elements in place and centered under each of balls 17. Each of these stabilizing arm members is secured to a ring member 29 that is in turn secured to frame 11. Each of support members 20 preferably include four flexure hinge points 30 which enable the support members to bend, flex and function as required in accordance with the present invention. Each of the support members also include an arm member 31 extending therefrom the function of which is explained in detail hereinbelow. The support member (including stabilizing arm 28 and arm member 31, and the cup-like element) can be formed of one molded piece of plastic wherein each of the flexure hinge points 30 would be formed by a reduced cross section of the mold.

Secured to shaft member 15 is a camming arm 32 that is positioned to extend in a direction toward the collapsible support members 20. The camming arm is secured to and rotates with shaft member 15. The camming arm 32 includes a dish-like element 33 projecting from the end portion of the camming arm which includes an open portion with a cam surface 34 which is adapted to receive arm members 31. In operation, as camming arm 32 is rotated by motor 16 about a closed path, the arm members in a collapsed position are engaged by the cam surface and pushed in a manner which lifts the support members to an extended and non-collapsed position.

A switch 35 is electrically connected to motor 16 ane energizes the motor when pan 12 is depressed by a load 13 in the manner as more fully described hereinbelow. The switch is preferably a double pole type electrical displacement switch having one portion thereof mounted on the bottom portion of pan 12 (see FIG. 2).

Balance 10 includes a read-out system for visually displaying the weight of the load. This system includes a lamp 36 secured to camming arm 32 so that it revolves along with the camming arm. Located directly under lamp 36 is an opening 37 which permits light to be projected from lamp 36 to any of a plurality of light pipes 38 as camming arm 26 rotates around its path. One of the end portions 39 of each of the light pipes are arranged about a path positioned directly under the closed path of travel of lamp 36 (see FIG. 3). Each of the other end portions of each of the light pipes is positioned by a number on display panel 40 that corresponds to the different measurements of weight.

The primary function of motor 16 is to turn shaft member 15, and guide camming arm 32 about a path into contact with successive collapsed support members 20 (or extended support members when the motor operates in reverse in the manner as described hereinbelow) in a step-by-step manner, i.e. a motor capable of moving one pole position for every input pulse. Examples of the type of motors that can be used to accomplish this function include a stepping motor or a DC servo motor with a shaft encoder. The invention will be hereinafter described using a stepping motor for illustrative purposes. In accordance with the present invention any conventional stepping motor can be used. With a sixteen division scale, using sixteen weight elements (balls) 17, the number of poles on the stepping motor would be selected to be a multiple of sixteen so that the poles would then determine the intermediate stopping points at each of the positions where a ball is located and is to be lifted or lowered.

As illustrated in FIG. 2, pan 12 is supported on shaft member 15 in a manner which enables the pan to float on the shaft member by spring 50. The pan lies on the spring in such a manner whereby it can move vertically (float) on shaft member 15. Preferably two bearings 41 and 42 are provided between shaft member 15 and the inside surface of hollow shaft member 14 which permit the shaft member to freely rotate within the hollow shaft member and also allow pan 12 to move freely in a vertical direction on shaft member 14. Also provided in the balance is a means to prevent any rotational movement of pan 12 without interferring with the vertical movement of the pan. This can be accomplished by the use of a freely pivoting linkage device 43 secured at one end to the pan and at the other end to frame 11.

Illustrated in FIG. 2 is an adjusting screw 44 which permits one to "zero" the balance. With no weight on pan 12, the pan will settle to a certain position on spring 50. The adjusting screw is employed to raise or lower the pan so that it can be brought to the position that with no weight thereon the two poles of switch 35 will not touch but will lie in contiguous relation and thus all of the support members 20 will be in a collapsed position with all of balls 17 being supported within ball retaining ring 18.

The balance in accordance with the present invention has particular use as a low range automatic balance in the postal field. Although the balance described herein is for measuring the weight of objects of less than or equal to one pound, it is to be noted that low range balances in accordance herewith can include balances for measuring objects, practically speaking, up to about four pounds. A one pound balance in accordance with the features of the present invention would employ sixteen one ounce balls each made of some dense material, preferably steel, and each being accurately machined to a precise diameter, and thus a precise weight of one ounce. The entire balance has a primary overall advantage that it can be constructed very inexpensively by being made out of different plastic materials. This would include such parts as, for example, frame 11, support members 20, pan 12, shaft member 15, etc.

In operation, a user would start using balance 10 by first turning on the on/off switch 45 which allows electrical current to flow to the balance. With no weight on pan 12, all of the sixteen support members 20 would be in a collapsed position. See support member 26 in FIG. 2. All of the corresponding balls would be resting within the confines of the ball retaining ring 18 as illustrated by ball 27. When a weight is placed on pan 12 as designated by arrow 46, the pan descends vertically causing the two poles of switch 35 to make contact. Since the switch is electrically connected to stepping motor 16, placing a weight on the pan energizes the stepping motor which starts rotating shaft member 15 and thereby rotates camming arm 32 about its path. For a postal balance, any weight placed on pan 12 that weighs up to and including one ounce will display a one ounce reading on display panel 40. Thus, when any weight less than or equal to one ounce is placed on the pan, the stepping motor will cause the camming arm to move a distance of 1/16th about its total circular path to the first collapsed support member where the camming surface 34 of camming arm 32 will connect with the arm member 31 of the support member located in the first position thereby lifting this support member to a non-collapsed and extended position. As shown in FIG. 2, when this motion occurs, cup-like element 47 is pushed through opening 48 in the bottom portion of the U-shaped channel ball retaining ring 18 and lifts ball 24 vertically so that it no longer rests within the ball retaining ring. At this point, pan 12 would be in equilibrium with the weight thereon thereby allowing the pan to float on spring 50 to its original position (i.e. the position of the pan without a weight thereon) causing switch 35 to open and thereby stopping stepping motor 16. The light from light source 36 would then project through opening 37 in the camming arm to the corresponding light pipe whose end portion 39 is positioned thereby. Thus that part of display panel 40 that shows the number 1 (representing a one ounce weight) would light up. If, for example, the initial weight placed on pan 12 weighed over one ounce, but less than or equal to two ounces, then after lifting the first ball, the stepping motor would cause the camming arm to revolve on shaft 15 to the next collapsed support member (i.e. 2/16ths about the circular path), where as described above, the second ball would be lifted off ball retaining ring 18 and light 36 would then be positioned over the corresponding light pipe representing a two ounce weight which would light as two ounces on the display panel. Thus, whenever a sufficient number of balls (up to 16) representing the total weight of the object on the pan (up to a total of 16 ounces) have been lifted off of the ball retaining ring, spring 50 returns to its original position (its position without any weight) which causes the switch to open and power to be removed from the stepping motor so that it stops rotating. At that point light 36 will be positioned over a light pipe that corresponds the amount of weight on the pan. In turn, the light pipe conducts light to display screen 40 located on the front portion of the base of the balance correspondingly lighting up a number on the display screen equivalent to the number of balls that have been removed from the ball retaining ring.

When the object being weighed is removed from the balance, pan 12 moves vertically upwards on spring 50 such that the second pole of double pole switch 35 is closed. This causes stepping motor 16 to rotate in a reverse direction thereby causing shaft member 15 and camming arm 32 to rotate in their same paths, but in a reverse direction. Thus, if the entire object being weighed is removed from the pan, cam surface 34 travels in a reverse direction about its path thereby contacting each of the arm members 31 of support members 20 which are in an extended position so as to pull each of them down to a collapsed position and successively place each of the balls 17 back down into the ball retaining ring unit 18. The balance mechanism returns to the neutral position which is the zero position if the weight is completely removed from the pan.

The balance in accordance with the features of the present invention is constructed so as to be substantially insensitive to various load shifts or eccentric loads which occur, for example, (i) when the item to be weighed is placed on a corner or an edge of pan 12, or (ii) when, for example, the first eight balls are removed from the ball retaining ring 18 thereby leaving an uneven distribution of the balls resting on the pan. The drive mechanism of motor 16 is such that shaft member 15 oscillates slightly about any one of the pole positions of the motor. When, for example, the motor is a stepping motor, the oscillations are made by shaping the current pulses (e.g., reducing the voltage amplitude and/or duration) to having a continual oscillation. This oscillation, which will impart a relatively small rotational relative movement between the supporting shaft 15 and bearings 41 and 42 will allow the pan to adjust axially on the shaft so that any frictional hysterisis will be substantially eliminated.

While this invention has been described in conjunction with specific embodiments thereof, it is evident that many alternatives, modifications and variations will be apparent to those skilled in the art. Accordingly, the present invention is intended to embrace all such alternatives, modifications and variations and fall within the spirit and scope of the appended claims.

I claim:

1. A weighing device comprising:
   a frame;
   a pan element for supporting a load to be weighed;
   means connected to said pan for retaining a plurality of weight elements in a vertically movable manner;
   a motor supported within said frame;
   a shaft member operatively connected to and extending from said motor including means to support said pan element;
   a plurality of collapsible support members, each of said support members secured at one end thereof to said frame and each having at their opposite ends means adapted to receive and lift one of said weight elements when said member is in an extended and non-collapsed position;
   a camming arm secured to said shaft member and extending in a direction toward said support members; and
   switching means for energizing said motor when said pan is depressed by a weighted load said motor turning said shaft member and guiding said camming arm into contact with successive collapsed support members in a step-by-step manner to place a number of said support members in an extended position and lift a corresponding number of said weights substantially equal to the weight of said load.

2. A weighing device according to claim 1 wherein said means for supporting said pan comprises a spring positioned on the end of said shaft member, the spring having sufficient resiliency to axially support said pan in a floating manner on said shaft.

3. A weighing device according to claim 2 further comprising read-out means for visually displaying the weight of said load.

4. A weighing device according to claim 2 wherein said pan element includes a hollow sleeve member extending from the bottom portion thereof on said shaft member.

5. A weighing device according to claim 4 further comprising at least one bearing surface between said shaft member and said sleeve member to permit said shaft member to rotate within said sleeve and said pan to move vertically on said shaft.

6. A weighing device according to claim 2 wherein said means for receiving a lifting said weight elements comprises a cup-like element.

7. A weighing device according to claim 2 wherein said means for retaining said weight elements comprises a U-shaped channel member extending from the bottom portion of said pan about said closed path.

8. A weighing device according to claim 7 wherein the bottom portion of said U-shaped channel member includes an opening adapted to permit said cup-like elements to extend therethrough.

9. A weighing device according to claim 2 wherein said collapsible support members are arranged within a concentric path.

10. A weighing device according to claim 2 wherein said weight elements comprises sixteen balls, each ball weighing about one once.

11. A weighing device according to claim 2 wherein each of said support members include an arm member extending therefrom and said camming arm element includes a dish-like member including an open portion having a cam surface adapted to engage said arm member.

12. A weighing device according to claim 2 wherein said switching means is a double pole electrical displacement switch.

13. A weighing device according to claim 3 wherein said read-out means comprises in combination; a lamp secured to said camming arm; a numerical display panel on said frame for displaying the weight of an object; and a plurality of light pipes, one end of each of the pipes arranged about a closed path lying directly under the direction of travel of the lamp in a position juxaposed to one of said weight elements and the other end of each of the pipes being positioned by the number on the display panel that corresponds to the total weight indicative by the weight element at which the opposite end of the light pipe is positioned.

14. A weighing device according to claim 1 wherein said motor is a stepping motor.

15. A weighing device comprising:
a frame;
a pan element for supporting a load to be weighed;
means connected to said pan for retaining a plurality of weight elements in a vertically movable manner;
a motor supported within said frame;
a shaft member operatively connected to and extending from said motor and supporting said pan element;
a plurality of support members, each having top end portions adapted to receive and lift one of said weight elements;
a camming arm secured to said shaft member and extending in a direction toward said support members; and
switching means for energizing said motor when said pan is depressed by a weighted load said motor turning said shaft member and guiding said camming arm into contact with successive support members in a step-by-step manner to place a number of said support members in an extended position and lift a corresponding number of said weights substantially equal to the weight of said load.

* * * * *